US009248842B1

(12) United States Patent
Gunaratne (10) Patent No.: US 9,248,842 B1
(45) Date of Patent: Feb. 2, 2016

(54) ENVIRONMENT-BASED FUNCTION LOCK SYSTEM FOR A VEHICLE (71) Applicant: Toyota Motor Engineering & Manufacturing North America, Inc., Erlanger, KY (US)

(72) Inventor: Pujitha Gunaratne, Windsor (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/330,121

(22) Filed: Jul. 14, 2014

(51) Int. Cl.
*B60W 50/12* (2012.01)
*B60W 50/14* (2012.01)
*G08G 1/0967* (2006.01)
*B60R 16/023* (2006.01)

(52) U.S. Cl.
CPC ............... *B60W 50/12* (2013.01); *B60W 50/14* (2013.01); *B60R 16/0232* (2013.01); *B60W 2520/06* (2013.01); *B60W 2520/10* (2013.01); *B60W 2520/105* (2013.01); *B60W 2540/28* (2013.01); *B60W 2540/30* (2013.01); *B60W 2550/12* (2013.01); *B60W 2550/13* (2013.01); *B60W 2550/14* (2013.01); *B60W 2550/20* (2013.01); *G08G 1/0967* (2013.01); *G08G 1/096708* (2013.01)

(58) Field of Classification Search
CPC ...................... G08G 1/0967; G08G 1/096708; G08G 1/096716; G08G 1/096725; B60R 16/0232
See application file for complete search history.

(56) References Cited

U.S. PATENT DOCUMENTS

| 6,266,589 | B1 * | 7/2001 | Boies et al. ..................... 701/36 |
| 6,898,513 | B2 * | 5/2005 | Blumbergs et al. ........... 701/538 |
| 7,349,782 | B2 * | 3/2008 | Churchill et al. ............... 701/45 |
| 7,565,230 | B2 | 7/2009 | Gardner et al. |
| 7,930,096 | B2 * | 4/2011 | Kubota et al. ................. 701/514 |
| 8,188,887 | B2 * | 5/2012 | Catten et al. .................. 340/905 |
| 8,285,453 | B2 | 10/2012 | Schroeder et al. |
| 8,502,642 | B2 | 8/2013 | Vitito |
| 2006/0142917 | A1 | 6/2006 | Goudy |
| 2010/0250106 | A1 * | 9/2010 | Bai et al. ........................ 701/117 |
| 2012/0041633 | A1 | 2/2012 | Schunder et al. |
| 2013/0124038 | A1 * | 5/2013 | Naboulsi ................. G06F 17/00 701/36 |
| 2014/0106726 | A1 * | 4/2014 | Crosbie et al. ................ 455/418 |

FOREIGN PATENT DOCUMENTS

EP       2192015 A1 *  6/2010
WO   WO2013/029258 A1 *  3/2013

* cited by examiner

*Primary Examiner* — Michael J Zanelli
(74) *Attorney, Agent, or Firm* — Christopher G. Darrow; Darrow Mustafa PC (57) ABSTRACT

A computing device and methods for restricting driver interactions with vehicle functions based on a challenging driving environment are disclosed. One example method for restricting driver interactions with vehicle functions based on a challenging driving environment includes identifying a challenging driving environment based at least in part on information regarding a driving condition; and preventing a driver from accessing one or more vehicle functions based on the challenging driving environment exists. Example implementations include identifying a challenging driving environment based on information received from on-vehicle sensors and/or external communication links; identifying a driver's skill level; and selectively blocking vehicle functionality, selectively presenting information to a driver, and selecting available driver interactions based on the driving environment.

20 Claims, 7 Drawing Sheets

ENVIRONMENT-BASED FUNCTION LOCK SYSTEM FOR A VEHICLE

BACKGROUND

Many non-driving-related vehicle systems, such as navigation systems, do not allow a driver to input information when the vehicle is moving or in gear. These controls tend to be over inclusive because they prevent all user input, or they prevent user input in all cases, even though the degree of attention and manual interaction required of the driver may vary widely depending on the circumstances and driving conditions. For example, some interactions by a driver may be of a limited nature, such as turning off the radio with a single button push, and thus involve minimal engagement, while other types of interactions may be more substantial, such as entering an address from scratch on a navigation system, and thus involve more significant driver engagement. In addition, some driving environments, such as those involving a winding road, traffic, or inclement weather, demand more driver attentiveness than other driving environments, such as driving on a straight road at a reasonable rate of speed on a clear day. Existing restrictions on a driver's interactions with vehicle functions do not reflect the driver attention requirements associated with the variety of environments in which a driver may be operating a vehicle. Moreover, the restrictions currently employed may be viewed as onerous by drivers, which could make drivers less likely to pay attention to and/or adhere to controls imposed by the vehicle interface systems.

In addition, if a driver suddenly encounters challenging driving conditions such as traffic or inclement weather, the driver may desire to activate functions that relate to the relevant driving environment. Because vehicles often are equipped with a single display that is needed for several vehicle functions (such as a multimedia system, a navigation system, and a climate control system), it is incumbent upon the driver to affirmatively switch the display's functionality to the functionality that is most applicable to the driver's current situation, such as rerouting functionalities on the navigation system or changing the channel to a weather-related station on the multimedia system. This generally requires a visual-manual interaction, which may entail significant driver engagement and attention. On the other hand, the systems described above that restrict the driver from interacting with these functionalities, if employed, may prevent the driver from obtaining critical information that relates to the driving environment.

SUMMARY

Disclosed herein are devices, systems, and methods for controlling vehicle functions and presenting information to a driver based on the driving environment. One example implementation includes identifying a current driving environment based on on-vehicle sensors and/or external communication links. If a challenging driving environment is detected, the driver can be prevented from accessing one or more vehicle functions, and additionally the driver can be presented with information relating to the challenging driving environment.

In one implementation, a computing device is disclosed. The computing device includes one or more processors for controlling the operations of the computing device and a memory for storing data and program instructions used by the one or more processors. The one or more processors are configured to execute instructions stored in the memory to: identify a challenging driving environment based at least in part on information regarding a driving condition; and selectively prevent a driver from accessing one or more vehicle functions based on the challenging driving environment.

In another implementation, a computer-implemented method for restricting driver interaction with vehicle functions is disclosed. The method includes identifying a challenging driving environment based at least in part on information regarding a driving condition; and selectively preventing a driver from accessing one or more vehicle functions based on the challenging driving environment.

In another implementation, a system is disclosed, which includes one or more sensors associated with a vehicle; and a computing device in communication with the one or more sensors, the computing device comprising one or more processors for controlling the operations of the computing device and a memory for storing data and program instructions used by the one or more processors, wherein the one or more processors are configured to execute instructions stored in the memory to: identify a challenging driving environment based at least in part on information received from the sensors regarding a driving condition; and selectively prevent a driver from accessing one or more vehicle functions based on the challenging driving environment.

BRIEF DESCRIPTION OF THE DRAWINGS

The description herein makes reference to the accompanying drawings wherein like reference numerals refer to like parts throughout the several views, and wherein.

DETAILED DESCRIPTION

The description below describes systems and methods for controlling vehicle functions and presenting information to a driver based on a challenging driving environment. One example implementation includes identifying a current driving environment based on information regarding current driving conditions received from on-vehicle sensors and/or external communication links. If a challenging driving environment is detected, the driver can be prevented from accessing one or more vehicle functions, and additionally the driver can be presented with information relating to the challenging driving environment. Another example implementation includes identifying a driver's skill level based on on-vehicle sensors, data stored about past driver skill data, and driver profiles available from external sources. Another example implementation includes ranking user interactions with vehicle functionality based on the driver attention necessary to carry out such user interactions. Another example implementation includes selectively blocking vehicle functionality based on the driving environment. Another example implementation includes selectively presenting information to a driver based on the driving environment. Another example implementation includes selecting available driver interactions based on the driving environment.

Figure 1:
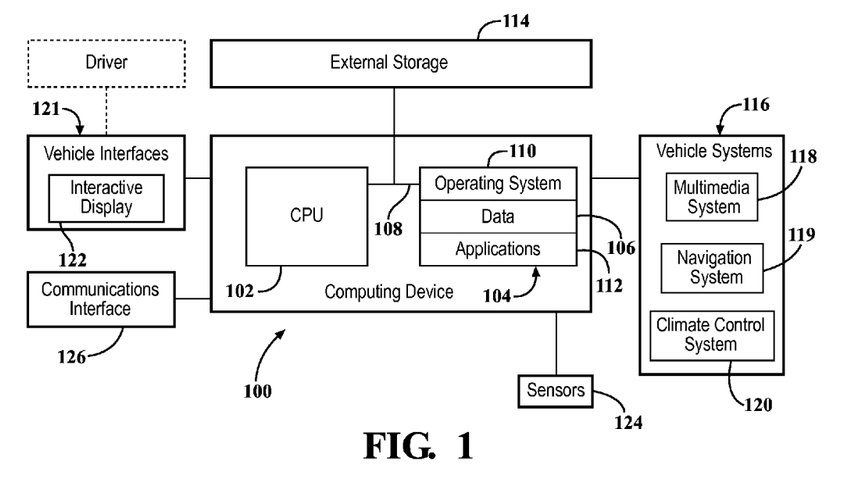
FIG. 1 is a block diagram of a computing device for restricting driver interactions with vehicle functions based on a challenging driving environment.

FIG. 1 is a block diagram of a computing device 100 for controlling driver interactions with vehicle functions based on a driving environment. The computing device 100 can be any type of vehicle-installed, handheld, desktop, or other form of single computing device, or can be composed of multiple computing devices. The processing unit in the computing device 100 can be a conventional central processing unit (CPU) 102 or any other type of device, or multiple devices, capable of manipulating or processing information. A memory 104 in the computing device can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs that permit the CPU 102 to implement controlling driver interactions with vehicle functions based on a driving environment, as described below. The computing device 100 can also include secondary, additional, or external storage 114, for example, a memory card, flash drive, or any other form of computer readable medium. In one embodiment, the installed applications 112 can be stored in whole or in part in the external storage 114 and loaded into the memory 104 as needed for processing.

The computing device 100 can be in direct or indirect communication with one or more vehicle systems 116, including, for example, a multimedia system 118, a navigation system 119, a climate control system 120, or other vehicle system. The computing device 100 can also be in direct or indirect communication with one or more vehicle interfaces 121 configured to receive input from the driver and provide feedback to the driver of the vehicle. The vehicle interfaces 121 can include, for example, an interactive display 122. The interactive display 122 can be configured to allow the driver to send commands to the computing device 100 intended to control the operation of the vehicle systems 116 as further described below. Other vehicle interfaces 121, for example, a voice recognition system, could also be configured to receive driver commands regarding various vehicle systems 116. Similarly, an audio system may be used as a vehicle interface 121 to provide feedback to the driver. The computing device 100 may also be in direct or indirect communication with one or more sensors 124 and/or a communications interface 126. The computing device 100 can be configured to receive information regarding driving conditions the driver encounters or will soon encounter from the sensors 124 and the communications interface 126, as discussed in more detail below.

Figure 2:
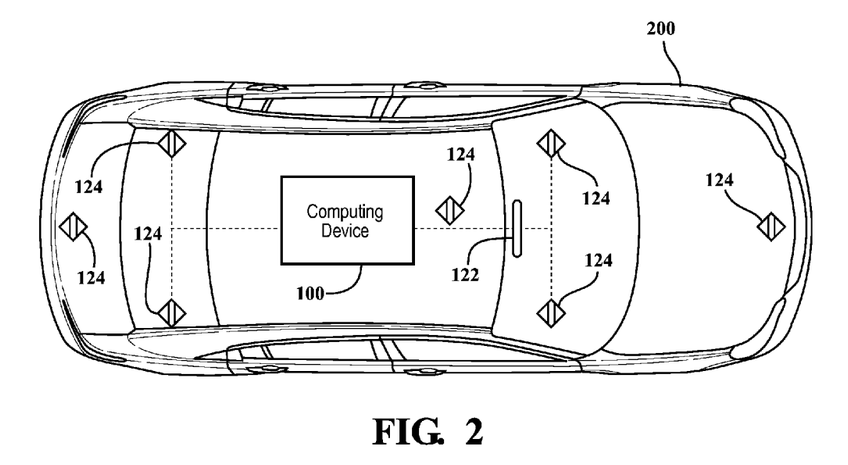
FIG. 2 is a schematic illustration of a vehicle including the computing device of FIG. 1.

FIG. 2 shows a schematic of a vehicle 200 that includes the computing device 100 described in FIG. 1. The computing device 100 can be located within the vehicle 200 as shown in FIG. 2 or can be located remotely from the vehicle 200 in an alternate location (not shown). If the computing device 100 is remote from the vehicle, the vehicle 200 can include the capability of communicating with the computing device 100, for example through the communications interface 126.

The vehicle 200 can also include the vehicle interfaces 121 that allow the driver to send commands to the vehicle 200 and receive feedback from the vehicle systems 116. One example vehicle interface 121 shown in FIG. 2 is the interactive display 122. Using the interactive display 122, the driver can both view information related to the various vehicle systems 116 and enters commands to control the vehicle systems 116 as further described below. Other example vehicle interfaces 121 can include a voice recognition interface, buttons, paddles, knobs, dials, switches, or any other vehicle interface 121 allowing the driver to interact with the vehicle 200.

Figure 3:
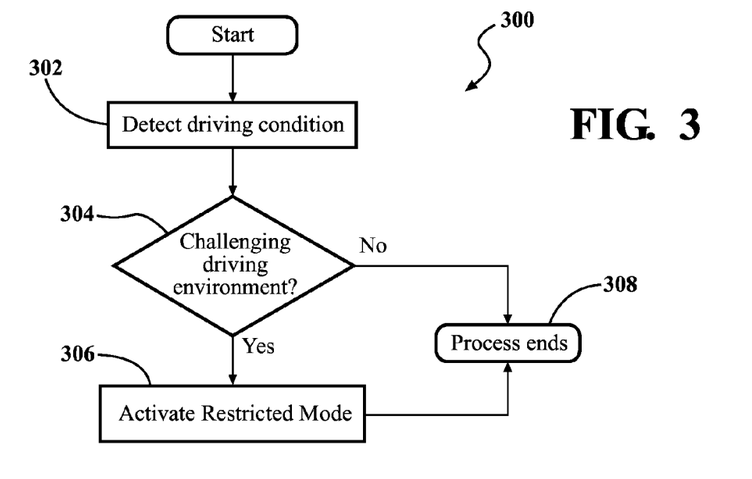
FIG. 3 is a logic flowchart of an example process for restricting driver interactions with vehicle functions based on a challenging driving environment.

FIG. 3 is a logic flowchart of a process 300 for restricting a driver interface based on a challenging driving environment in accordance with an example implementation. In step 302 of the process, the computing device 100 detects a driving condition. Examples of driving conditions that may signal a challenging driving environment may include inclement weather, a winding road, a mountain road, a dense urban environment, significant traffic, or any other driving condition that demands extra caution and attentiveness from the driver. Detecting the driving condition may include receiving information relating to the driving condition, and information regarding the driving condition may come from many sources. In accordance with one implementation, the vehicle 200 may be equipped with the sensors 124 that detect information regarding the driving environment, including information regarding the movement of the vehicle 200 itself. Examples of the one or more sensors 124 could include any of: accelerometers, altimeters, thermometers, optical sensors, location sensors, or other types of sensors. For example, one or more accelerometers may be used to report sudden movements of the vehicle 200, and the computing device 100 may extrapolate the driving pattern of the vehicle 200 from data received from the accelerometers. Altimeters may be used to report the altitude of the vehicle 200, from which the computing device 100 may determine that the vehicle 200 is on a mountain road. Thermometers, barometers, and rain sensors can report the state of the weather. Optical sensors (e.g., cameras), together with image analysis systems, may also be employed to detect the movements of the vehicle 200 or the environmental conditions surrounding the vehicle 200.

The sensors 124 may also include one or more location sensors, such as a GPS receiver. In one implementation, the computing device 100 may receive location data from a GPS receiver and based on the location data, determine that the vehicle 200 is driving through an area that is known to have challenging driving conditions, such as a dense urban city, or a mountainous region, or a winding road. Location data can also reveal the speed of the vehicle 200, which can in turn, including in combination with other sensor information, indicate that the vehicle 200 is in slowly moving traffic, or, alternatively, that the vehicle 200 is traveling at a high rate of speed, either of which may signal a challenging driving environment.

In one implementation, the computing device 100 may receive information regarding the driving condition using the communications interface 126. The communications interface 126 may receive data from a network such as the internet, or from a traffic infrastructure network that includes devices configured to broadcast relevant driving information (such as communications towers and traffic signals and the like), or from other vehicles that are equipped to transmit driving condition information to other vehicles within range. As an example, information regarding driving conditions that could be received via the communications interface 126 may include traffic and weather information regarding the vehicle 200's immediate location or a location that it will encounter along its intended route.

In step 304, the computing device 100 evaluates the detected driving condition and makes a determination whether the driving condition meets the threshold for a challenging driving environment. If it does, then at step 306, the computing device 100 enters the vehicle into a restricted mode by selectively restricting certain vehicle functions. If the computing device determines that the detected driving condition does not reveal a challenging driving environment, then no action is taken and the vehicle 200 remains in unrestricted mode. Either way, the process ends at step 308. With the vehicle 200 operating in restricted mode, the driver will not be able to interact with selected non-driving-related functions. For example, the driver can be prevented from changing the radio station on the multimedia system 118 or changing the destination address on the navigation system 119.

In accordance with an example implementation, certain functions that require heightened attentiveness are restricted in restricted mode, while other functions are not. For example, the driver may be prevented from entering a new navigation address, while being permitted to select from a list of previously entered destinations. As another example, the driver may be permitted to change the radio station to a preset but not to enter a new station from a keypad. In accordance with an example implementation, whether a feature is restricted or not can depend on the number of button presses the feature requires to activate it, or the number of menu options required to activate it, as further described in FIGS. 6 and 7 below. For example, a driver may be allowed to select an album stored on the vehicle 200's multimedia system 118 or mobile device, so that the vehicle 200 will play the entire album, but the driver would not be allowed to select a specific song within the album because the menu depth is too great.

Figure 4:
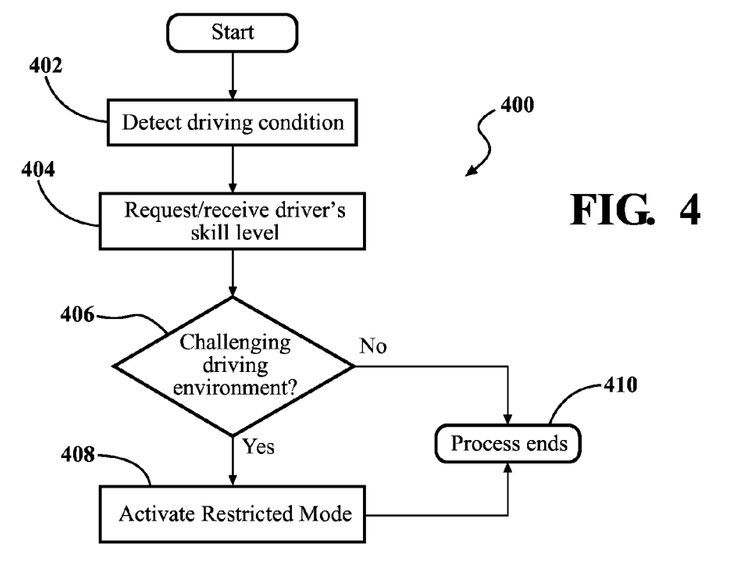
FIG. 4 is a logic flowchart of another example process for restricting driver interactions with vehicle functions based on a challenging driving environment.

FIG. 4 is a logic flowchart of a process 400 for restricting a driver interface based on the driving environment and driver skill, in accordance with a disclosed implementation. The driver's skill level may be inferred from the sensors 124, including those that can track the movements of the vehicle 200. Certain movements such as weaving between lanes and traveling at a high rate of speed may identify a driver as an inexperienced or unskilled driver. In addition, cameras can be used to watch the driver's gaze for distraction. Data about the driver's skill level may be stored on board or online (for example, utilizing the communications interface 126) in a driver profile for future use. By storing the data, the computing device 100 can adaptively learn the driver's skill from the driver's past driving experience, by monitoring and storing the information received by the sensors 124 over time in different challenging and non-challenging driving environments. The profile can also reveal that the driver is unskilled in a particular type of challenging driving environment (e.g., rain) while remaining skilled in other types of challenging driving environments (e.g., traffic).

In addition, or alternatively, the driver's skill level may be learned from external sources, such as state driving records or a profile completed by the driver. A determination of a driver's skill level may also be based on the driver's age, which can be stored in a driver profile or gleaned from public sources. The driver's skill may also be based on information such as the driver's driving record or the restrictions placed on the driver's license by the licensing authorities (for example in the case of a graduated license). The driver's skill level may be implemented as a score, a grade, or some other metric. In any case, it may constitute a threshold for evaluating whether a driving condition is a challenging driving condition for this particular driver.

In step 402, the computing device 100 detects a driving condition, as described above with respect to FIG. 3. In step 404, the computing device 100 requests and receives the driver's skill level. In step 406, the computing device 100 evaluates the driving condition in light of the driver's skill level to determine whether there is a challenging driving environment. A driving condition may be challenging for an inexperienced or unskilled driver but may not be challenging for a driver with a higher skill level or more experience. Accordingly, certain non-driving functions can be restricted for an unskilled driver but not for a skilled driver. If, in step 406, the computing device 100 determines that the driving condition presents the driver with a challenging driving environment, given the driver's skill level, then, at step 408, restricted mode is activated. If the driving condition severity does not meet the threshold for this particular driver's skill level, then the vehicle 200 remains in unrestricted mode. Either way, the process ends at step 410.

Figure 5:
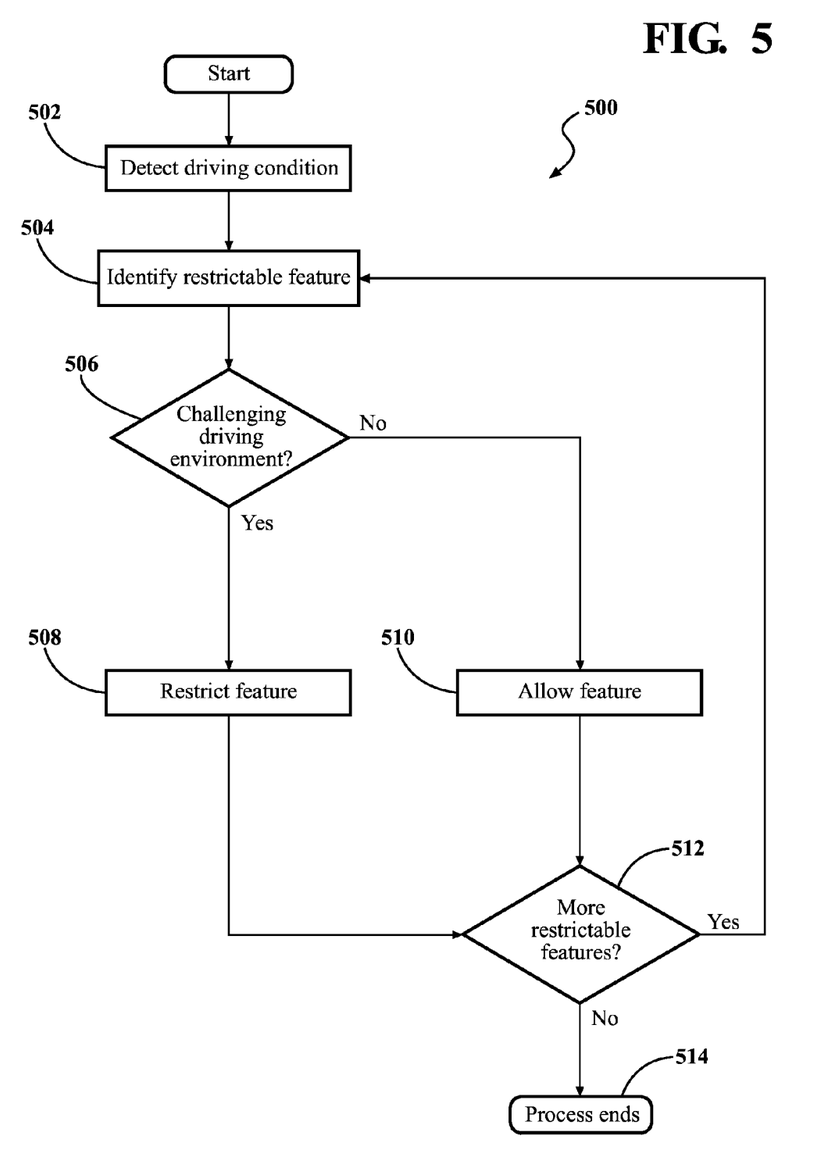
FIG. 5 is a logic flowchart of another example process for restricting driver interactions with vehicle functions based on a challenging driving environment.

FIG. 5 is a logic flowchart of a process 500 for restricting a driver interface based on the driving environment, in accordance with one example implementation. In an example implementation, different non-driving-related features have different thresholds for being blocked from the driver, based on an attention factor associated with the respective feature. In some instances, it is possible that some feature interactions have a low attention factor (that is, they require very little attention from the driver), in which case they may be allowed in challenging driving environments and will not be blocked while the vehicle 200 is in restricted mode. Other selected feature interactions, however, may have a higher attention factor (that is, they require more attention from the driver), but drivers are still able to drive safely while engaging in such feature interactions. In this case, it may be desirable to allow the feature interaction in some mildly challenging driving environments, but in a more substantially challenging driving environment, the selected feature interaction would be blocked. Finally, other selected feature interactions may have a very high attention factor (that is, they require substantial attention from the driver), so these will be blocked in any instance in which the computing device detects a challenging driving environment. FIG. 5 illustrates this implementation.

In step 502, the computing device 100 detects a driving condition, as described above with respect to FIG. 3. In steps 504-512, the computing device 100 determines which selected features, if any, will be blocked from the driver. Specifically, in step 504, the computing device 100 identifies a restrictable feature that has an associated threshold. In step 506, the computing device evaluates the driving condition in light of the restrictable feature threshold and makes a determination whether the severity of the detected driving condition meets the threshold for a challenging driving environment. If yes, then, at step 508, this selected feature will be restricted. If no, then, at step 510, this feature will remain accessible to the driver. In step 512, the computing device determines whether there are any more restrictable features, which may or may not be restricted depending on the severity of the driving condition, in accordance with the steps described. If there are more restrictable features, the process returns to step 504, in which the computing device 100 identifies the next restrictable feature. If not, the process 500 ends at step 514.

In one example implementation, both feature thresholds and the driver's skill level can be considered by the computing device 100 in evaluating the driving condition. Accordingly, in this implementation, the severity of the driving condition, the skill of the driver, and the attentiveness requirements of the feature are all examined to determine whether a particular feature will be available to a particular driver in a particular driving environment. For example, features may be made unavailable to the driver if the current challenging driving environment is similar to past challenging driving environments in which the driver drove poorly, but would remain available to the driver in a different type of challenging driving environment.

Figure 5A:
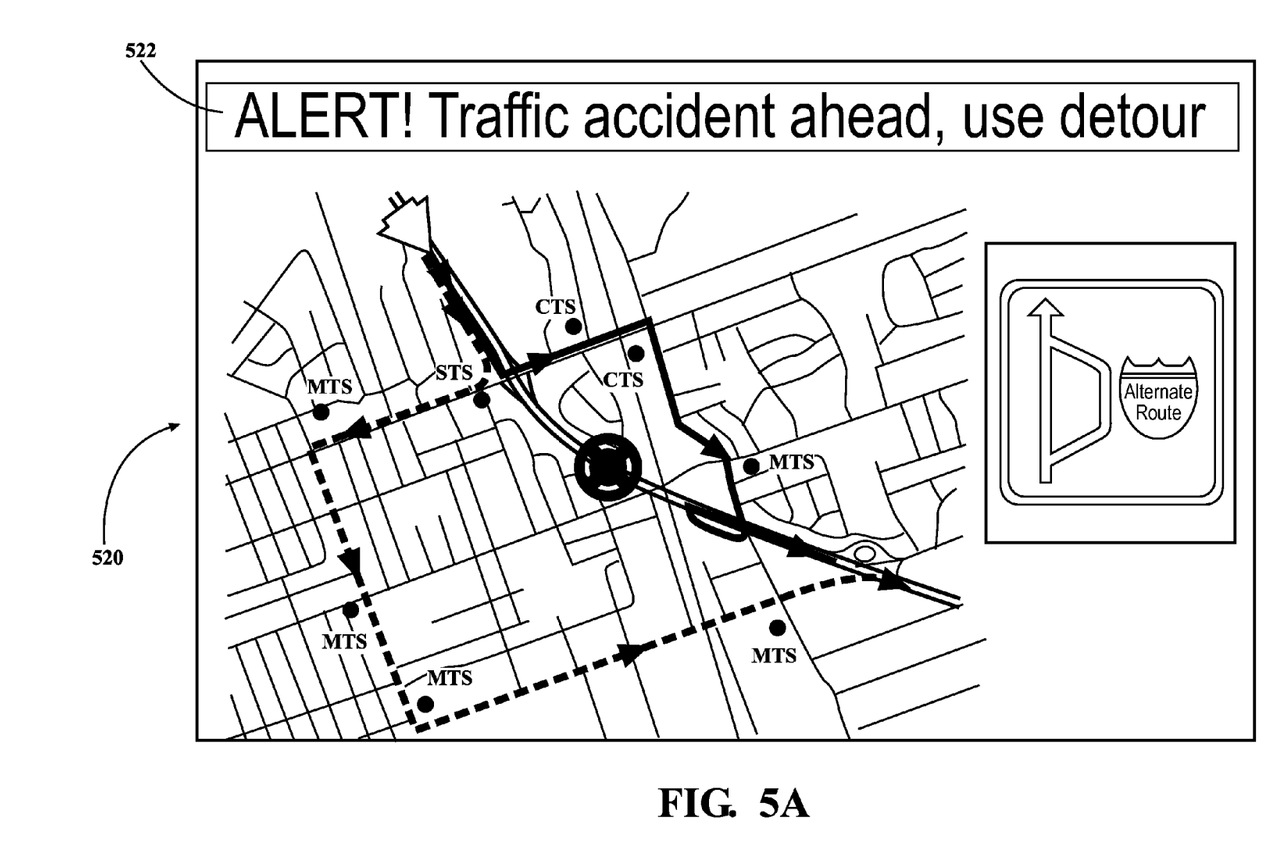
FIG. 5A is an example user interface for a challenging driving environment.
Figure 5B:
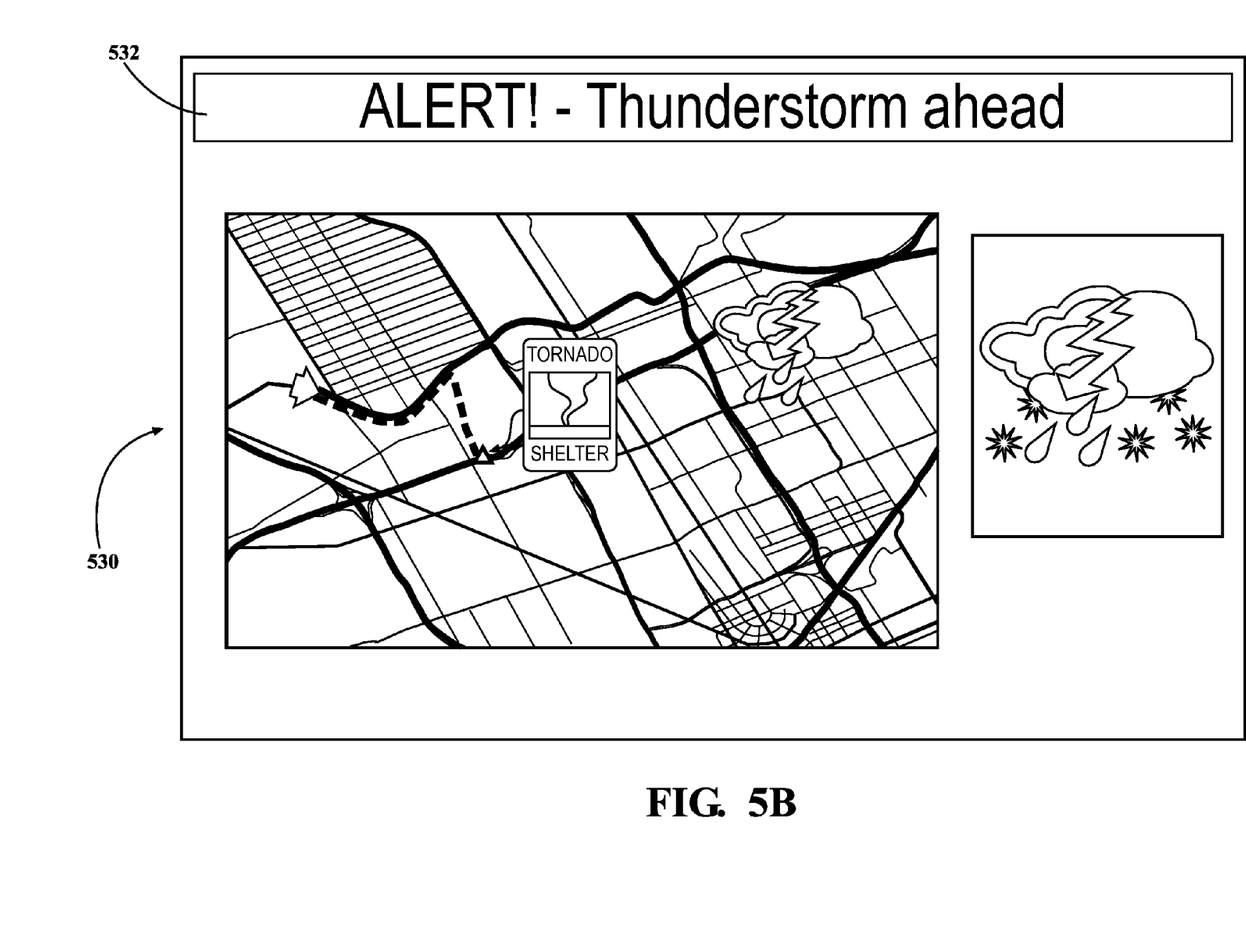
FIG. 5B is another example user interface for a challenging driving environment.

FIGS. 5A and 5B depict user interfaces that can be presented automatically to the driver in the event that the driver encounters a challenging driving environment. In accordance with one example implementation, information presented to the driver can be selected based on the driving conditions. For example, vehicle interfaces 121 such as interactive displays 122 are often used for several vehicle systems 116, such as the multimedia system 118, navigation system 119, climate control system 120, and other systems. Instead of the driver having to manually select the functionally most applicable to the driver's current driving condition, in accordance with this example implementation, if the driver suddenly encounters driving conditions such as traffic, the interactive display 122 can automatically switch from whatever functionality was being displayed to the functionally most applicable to the driver's current driving condition, such as the navigation system 119, with which the driver can be presented with a map showing alternate route information 520 and an alert 522 notifying the driver of the traffic condition, as illustrated in FIG. 5A. Similarly, as illustrated in FIG. 5B, if the driver suddenly encounters inclement weather, then the interactive display 122 can automatically display current weather information 530 (for example, as part of the navigation system 119), and an alert 532 notifying the driver of the weather condition. As another inclement weather example, the multimedia system 118 can automatically change the audio from whatever the driver was listening to a weather-related station.

In accordance with another example implementation, if a driver is nearing a location with congested traffic or bad weather or some other challenging driving environment, an auditory or visual advisory can be presented to the driver. This may be helpful so that the driver has enough time to modify a navigation route, for example. As the vehicle 200 continues to near the challenging driving environment, advisories can be presented more frequently to the driver or the advisories may be upgraded to "warnings" which could be more prominent auditory or visual reminders. As with the feature interaction restrictions described above, the response from the vehicle 200 may be more or less forceful depending on the severity of the challenging driving environment and/or the skill level of the driver (e.g., the vehicle 200 will issue more reminders or more conspicuous reminders to an unskilled driver). Additionally, if the interactive display 122 is currently displaying information about the vehicle 200's climate control system 120 and the computing device 100 detects traffic up ahead, the interactive display 122 may automatically change functions to, for example, the navigation system 119, to present route information to the driver, or to alert the driver that it is automatically rerouting a previously set route to avoid the traffic. As another example, if the computing device 100 detects inclement weather, it may automatically change the functionality of the interactive display 122 to the radio function as part of the multimedia system 118, and/or to automatically switch the station to a weather-related channel.

Figure 6:
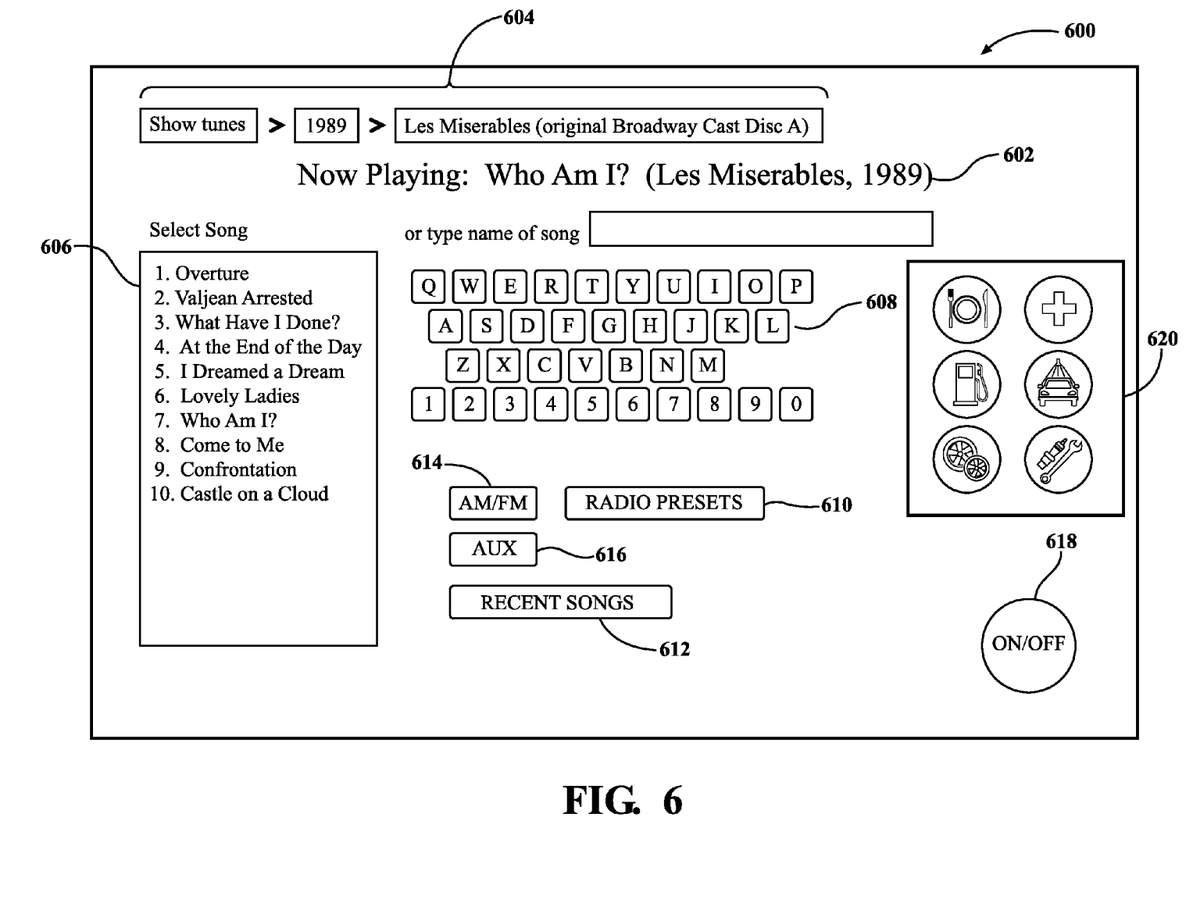
FIG. 6 is an example user interface for vehicle functions without driver restrictions.

FIG. 6 depicts a user interface 600 operating without any restrictions based on a challenging driving environment. In this example, a driver desires to use the multimedia system 118 to select a song from collection of music stored in computer memory, for example on memory 104 of the computing device 100, or on external storage 114, a driver's mobile device, or any other storage device. As illustrated by FIG. 6, a driver may select a song (such as the song listed in the "Now Playing" field 602) from an album, which may be represented by a menu in a series of nested menus 604 (e.g., genre>year>album). From the album menu, the driver can select the song from a list 606. In other words, the driver is able to select one menu, and then another submenu, and so on, until the driver makes a final song selection, which is a process that requires several commands and therefore requires relatively substantial driver engagement. Alternatively, the driver may type in the name of a song from a keyboard or keypad 608, which may be available through the interactive display 122. Options may also be presented to the driver to bring up another screen to select radio presets 610, a list of recently played songs 612, or the driver may switch the audio input to the radio 614 or a mobile device connected to the vehicle 200 through an auxiliary connection 616. An option may also be presented to the driver to toggle the multimedia system 118 on or off 618. A notification area 620 may be available to optionally display helpful notifications relevant to the driver's trip, even while the vehicle 200 is operating in unrestricted mode. For example, the notification area 620 can dynamically display information relating to nearby points of interest, such as restaurants, gas stations, etc.

Figure 7:
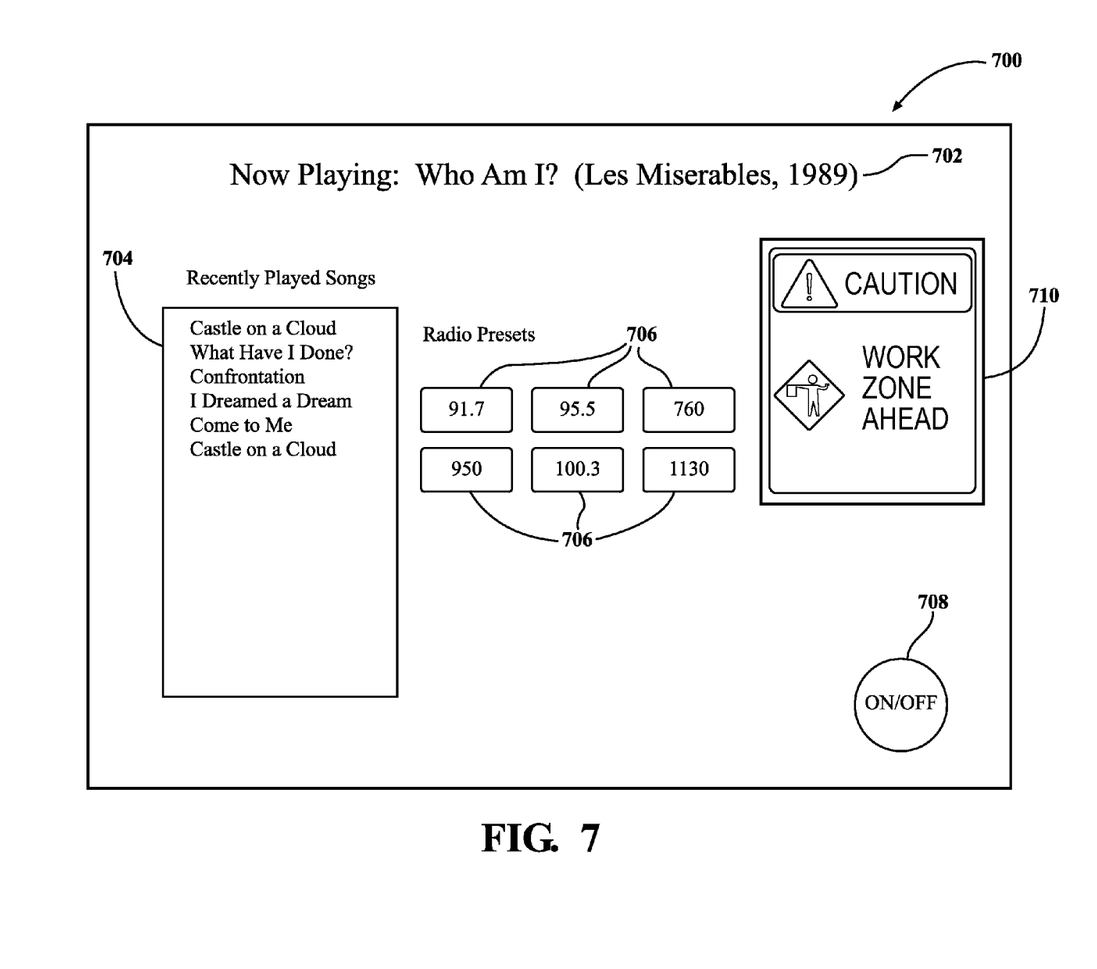
FIG. 7 is another example user interface for vehicle functions with driver restrictions.

FIG. 7 depicts a user interface 700 operating in restricted mode. As illustrated, the driver's audio choices are more limited. In this example, the interactive display 122 shows the currently playing song in the "Now Playing" field 702. However, the driver may only select a song from a list of recently played songs 704, or the driver may switch to a preset radio station by choosing a respective radio preset option 706. An on/off toggle option 708 may also available to the driver. FIGS. 6 and 7 are only exemplary, and many other combinations of options presented to the driver are available, but what is significant is that the items presented to the driver in the restricted mode require less attentiveness and engagement than the items presented to the driver in the unrestricted mode. Furthermore, as described in more detail above, different options or sets of features may be available to the driver depending on factors such as the severity of the challenging driving environment, the attention requirements of the respective features, and the skill or experience of the driver.

The restricted mode user interface 700 can also include a notification area 710 that can display information relating to the challenging driving environment, to the extent such information is available. For example, a challenging driving environment may be caused by construction on the road, or the nearby presence of a school, or traffic or inclement weather ahead. The notification area 710 can include an alert notifying the driver accordingly.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. For example, in the embodiments described above, the vehicle 200 is generally described an automobile. However, the vehicle 200 is not limited to an automobile, as the disclosed systems and methods could also be implemented with other vehicles generally controlled by a driver, or operator, such as airplanes, boats, trains, etc. The scope of the claims is thus to be accorded the broadest interpretation so as to encompass all such modifications and equivalent structures as is permitted under the law.

What is claimed is:

1. A computing device for a vehicle, comprising:
   one or more processors for controlling the operations of the computing device; and a memory for storing data and program instructions used by the one or more processors, wherein the one or more processors are configured to execute instructions stored in the memory to:
- identify an attention factor associated with at least one vehicle function;
- identify a challenging driving environment, the identification being: (1) based at least in part on information regarding a driving condition, and (2) with respect to the at least one vehicle function, based at least in part on the attention factor; and
- selectively prevent a driver from accessing one or more vehicle functions based on the challenging driving environment.

2. The computing device of claim 1, wherein the driving condition is associated with at least one of: vehicle speed, vehicle direction, vehicle acceleration, vehicle altitude, vehicle location, environmental temperature, environmental barometric pressure, environmental weather conditions, traffic conditions, and road conditions.

3. The computing device of claim 1, wherein the one or more processors receives the information regarding the driving condition from one or more sensors associated with the vehicle.

4. The computing device of claim 1, wherein the one or more processors receives the information regarding the driving condition from a remote source in electronic communication with a communications interface associated with the vehicle.

5. The computing device of claim 4, wherein the remote source is a remote server.

6. The computing device of claim 4, wherein the remote source is another vehicle or a traffic infrastructure network.

7. The computing device of claim 1, wherein the one or more processors are further configured to receive information regarding the driver's skill level; and
- wherein the identification of the challenging driving environment is based at least in part on the driver's skill level.

8. The computing device of claim 7, wherein the one or more processors are further configured to:
- alert the driver regarding the challenging driving environment;
- wherein the alert is based at least in part on the driver's skill level.

9. The computing device of claim 1, wherein the one or more processors are further configured to:
- alert the driver regarding the challenging driving environment.

10. A computer-implemented method for a vehicle, comprising:
- identifying an attention factor associated with at least one vehicle function;
- identifying a challenging driving environment, the identification being: (1) based at least in part on information regarding a driving condition, and (2) with respect to the at least one vehicle function, based at least in part on the attention factor; and
- selectively preventing a driver from accessing one or more vehicle functions based on the challenging driving environment.

11. The method of claim 10, wherein the driving condition is associated with at least one of: vehicle speed, vehicle direction, vehicle acceleration, vehicle altitude, vehicle location, environmental temperature, environmental barometric pressure, environmental weather conditions, traffic conditions, and road conditions.

12. The method of claim 10, wherein the information regarding the driving condition is received from one or more sensors associated with the vehicle.

13. The method of claim 10, wherein the information regarding the driving condition is received from a remote source via a communications interface associated with the vehicle.

14. The method of claim 10, further comprising:
- receiving an indication of the driver's skill level;
- wherein the identification of the challenging driving environment is based at least in part on the driver's skill level.

15. The method of claim 14, further comprising:
- alerting the driver regarding the challenging driving environment;
- wherein the alert is based at least in part on the driver's skill level.

16. The method of claim 10, further comprising:
- alerting the driver to the existence of the challenging driving environment.

17. A system, comprising:
- one or more sensors associated with a vehicle; and
- a computing device in communication with the one or more sensors, the computing device comprising one or more processors for controlling the operations of the computing device and a memory for storing data and program instructions used by the one or more processors, wherein the one or more processors are configured to execute instructions stored in the memory to:
  - identify an attention factor associated with at least one vehicle function;
  - identify a challenging driving environment, the identification being: (1) based at least in part on information received from the one or more sensors regarding a driving condition, and (2) with respect to the at least one vehicle function, based at least in part on the attention factor; and
  - selectively prevent a driver from accessing one or more vehicle functions based on the challenging driving environment.

18. The system according to claim 17, wherein the one or more processors are further configured to execute instructions stored in memory to:
- alert the driver regarding the challenging driving environment by automatically switching an interactive display to a display screen related to the challenging driving environment.

19. The system according to claim 18, wherein the challenging driving environment is a traffic condition, and the interactive display is switched to display navigation information.

20. The system according to claim 18, wherein the challenging driving environment is a weather condition, and the interactive display is switched to display weather information.

* * * * *